US007222263B2

(12) United States Patent
Maier

(10) Patent No.: US 7,222,263 B2
(45) Date of Patent: May 22, 2007

(54) PROGRAM-CONTROLLED UNIT WITH ON-CHIP DEBUG RESOURCES ABLE TO CONTROL WATCHDOG TIMERS

(75) Inventor: Klaus D. Maier, Biberach (DE)

(73) Assignee: Infineon Technologies AG, Munich (DE)

( * ) Notice: Subject to any disclaimer, the term of this patent is extended or adjusted under 35 U.S.C. 154(b) by 560 days.

(21) Appl. No.: 10/215,132

(22) Filed: Aug. 8, 2002

(65) Prior Publication Data

US 2003/0061544 A1 Mar. 27, 2003

(30) Foreign Application Priority Data

Aug. 8, 2001 (DE) ................................ 101 38 918

(51) Int. Cl.
*G06F 11/00* (2006.01)
(52) U.S. Cl. .......................................... 714/34; 714/28
(58) Field of Classification Search .................. 714/28, 714/34
See application file for complete search history.

(56) References Cited

U.S. PATENT DOCUMENTS

| 5,084,814 | A | * | 1/1992 | Vaglica et al. ............... 710/305 |
| 5,491,793 | A | * | 2/1996 | Somasundaram et al. ...... 714/45 |
| 5,544,311 | A | | 8/1996 | Harenburg et al. |
| 5,555,287 | A | * | 9/1996 | Gulick et al. ................ 455/557 |
| 5,644,703 | A | * | 7/1997 | Kurakazu et al. .............. 714/35 |
| 5,983,017 | A | * | 11/1999 | Kemp et al. .................. 717/129 |
| 6,021,511 | A | * | 2/2000 | Nakano ......................... 714/48 |
| 6,158,032 | A | * | 12/2000 | Currier et al. ............... 714/726 |
| 6,205,547 | B1 | * | 3/2001 | Davis .............................. 713/1 |
| 6,571,356 | B1 | * | 5/2003 | Mehr et al. .................... 714/28 |
| 6,587,966 | B1 | * | 7/2003 | Chaiken et al. ................ 714/34 |
| 6,757,846 | B1 | * | 6/2004 | Murray et al. ................. 714/34 |
| 6,907,548 | B2 | * | 6/2005 | Abdo ............................ 714/43 |
| 6,918,058 | B2 | * | 7/2005 | Miura et al. ................... 714/30 |
| 7,058,855 | B2 | * | 6/2006 | Rohfleisch et al. ............ 714/28 |

FOREIGN PATENT DOCUMENTS

EP 0 764 903 A1 3/1997

OTHER PUBLICATIONS

Microsoft Press Computer Dictionary Third Edition, "single step", Microsoft Press, 1997, pg. 437.*

* cited by examiner

*Primary Examiner*—Gabriel Chu
(74) *Attorney, Agent, or Firm*—Laurence A. Greenberg; Werner H. Stemer; Ralph E. Locher

(57) ABSTRACT

A program-controlled unit includes a core for executing the program to be executed by the program-controlled unit, and debug resources for tracking and influencing the operations proceeding within the core. The program-controlled unit is distinguished by the fact that the debug resources are able also to influence other components of the program-controlled unit and/or the cooperation of these components with one another and/or with the core. Such action makes it possible to avoid to the greatest possible extent, in a simple manner, the situation wherein disturbances or errors that do not occur in normal operation of the program-controlled unit occur during the debugging or emulation of the program-controlled unit, and/or wherein errors that occur in normal operation of the program-controlled unit do not occur during the debugging or emulation of the program-controlled unit.

31 Claims, 2 Drawing Sheets

PROGRAM-CONTROLLED UNIT WITH ON-CHIP DEBUG RESOURCES ABLE TO CONTROL WATCHDOG TIMERS

BACKGROUND OF THE INVENTION

Field of the Invention

The present invention relates to a program-controlled unit, having a core for executing the program to be executed by the program-controlled unit, and having debug resources for tracking and influencing the operations proceeding within the core.

Program-controlled units, such as microprocessors, microcontrollers, signal processors, etc., exist in innumerable embodiments and do not require more detailed explanation.

A problem of such program-controlled units is that it is often not possible or not readily possible to localize and eliminate errors that occur.

For such a reason, there has been a changeover to equipping program-controlled units with debug resources that make it possible to track and influence the operations proceeding within the program-controlled unit. These debug resources include, for example, the prior art on-chip debug support modules or OCDS modules.

Such and other debug resources make it possible to monitor the occurrence of states or events within the program-controlled unit, which states or events can be prescribed from outside the program-controlled unit, and, when such a state or such an event has occurred, to carry out actions that can be prescribed from outside the program-controlled unit.

The states or events whose occurrence can be monitored by the debug resources may include, by way of example, but not exclusively:
 the access by the program-controlled unit or specific components thereof to specific memory addresses or registers; and/or
 the transfer of specific data within the program-controlled unit; and/or
 the position of the instruction pointer.

The actions that the debug resources execute when such a state or other state or event occurs may include, by way of example, but likewise not exclusively:
 reporting of the fact that the condition to be monitored has occurred, to a device provided outside the program-controlled unit;
 the read-out or the alteration of the content of specific memory elements or registers;
 the outputting of trace information, i.e., the outputting of addresses, data, and/or control signals that are used or transferred within the program-controlled unit, to a device provided outside the program-controlled unit;
 the stopping of the program execution;
 the continuation of the program execution in the so-called single-step mode; or
 the execution of routines serving for the debugging or emulation of the program-controlled unit.

The provision of such debug resources in program-controlled units, thus, affords a whole host of possibilities for localizing and eliminating errors occurring in the program-controlled unit.

An existing disadvantage of such debug resources is that it is thereby often not possible to examine the program-controlled unit in real time. By way of example, if the debug resources cause the core of the program-controlled unit:
 to stop the program execution; or
 to continue the program execution in the single-step mode; or
 to execute instructions that do not belong to the (application) program that is actually to be executed, but, rather, are instructions serving for the debugging or emulation of the program-controlled unit, the program-controlled unit often behaves differently than is the case in normal operation thereof. The consequence of such behavior is that errors that occur in normal operation of the program-controlled unit often do not occur during the debugging or emulation of the program-controlled unit using the debug resources, and/or that errors that do not occur in normal operation of the program-controlled unit occasionally occur during the debugging or emulation of the program-controlled unit using the debug resources.

This greatly limits the possibilities for use of the debug resources. In particular, errors occurring in complex program-controlled units or applications are often not localized and eliminated by the debug resources, or are only partly localized and eliminated, or are localized and eliminated only with a very high outlay.

SUMMARY OF THE INVENTION

It is accordingly an object of the invention to provide a program-controlled unit that overcomes the hereinaforementioned disadvantages of the heretofore-known devices of this general type and that localizes and eliminates errors occurring in the program-controlled unit under all circumstances rapidly and simply.

With the foregoing and other objects in view, there is provided, in accordance with the invention, a program-controlled unit, including a core for executing a program, debug resources connected to the core for tracking and influencing operations proceeding within the core, other components connected to at least one of the debug resources and the core, and the debug resources influencing at least one of the other components and cooperation of the other components with at least one of one another and the core.

The program-controlled unit according to the invention is distinguished by the fact that the debug resources are able also to influence other components of the program-controlled unit than the core itself and/or the cooperation of these components with one another and/or with the core.

Such ability makes it possible to avoid problems that occur in conventional program-controlled units if the debug resources put the core into a state in which the latter behaves differently than in normal operation. In particular, it is, thus, possible to avoid the problems that result from the fact that the components of the program-controlled unit no longer operate and/or cooperate as intended in the case of an altered behavior of the core.

By virtue of the possibility of putting not only the core but also other components of the program-controlled unit into a state in which these behave differently than in normal operation, the behavior of the other components can be adapted to the altered behavior of the core. It is preferably provided that when the debug resources put the core of the program-controlled unit into a state in which the latter behaves differently than in normal operation, these debug resources automatically simultaneously adapt the other components of the program-controlled unit to the altered behavior of the core.

This makes it possible to avoid to the greatest possible extent, in a simple manner, the situation wherein disturbances or errors that do not occur in normal operation of the program-controlled unit occur during the debugging or emulation of the program-controlled unit, and/or wherein errors that occur in normal operation of the program-controlled unit do not occur during the debugging or emulation of the program-controlled unit.

In accordance with another feature of the invention, the other components are components having behavior influencing a behavior of the core.

In accordance with a further feature of the invention, the other components include at least one watchdog timer.

In accordance with an added feature of the invention, the debug resources deactivate the other components, turn off the other components, place the other components into a given state, reset the other components, reconfigure the other components, and/or alter signals fed to the other components.

In accordance with an additional feature of the invention, the influencing of the other components by the debug resources is a deactivation of the other components, a turning off of the other components, a placement of the other components into a given state, a reset of the other components, a reconfiguration of the other components, and/or an alteration of signals fed to the other components.

In accordance with yet another feature of the invention, the debug resources prevent the other components from cooperating.

In accordance with yet a further feature of the invention, the debug resources initiate cooperation of components not otherwise cooperating.

In accordance with yet an added feature of the invention, the debug resources at least one of carry out influencing of the other components and carry out the cooperation of the other components at least one of with one another and with the core automatically when predefined events occur.

In accordance with yet an additional feature of the invention, the predefined events include an altering of an overall behavior by actions executed by the debug resources.

In accordance with a concomitant feature of the invention, the debug resources executing actions altering a behavior of the core, the debug resources stopping execution of the program, the debug resources altering a speed at which the program is executed, the debug resources causing the core to execute the program in a single-step mode, the debug resources causing execution of instructions not part of the program, and/or the debug resources causing execution of instructions of one of a debugging program and an emulation program.

Other features that are considered as characteristic for the invention are set forth in the appended claims.

Although the invention is illustrated and described herein as embodied-in a program-controlled unit, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

The program-controlled unit described below is a microcontroller. However, it is noted that the special features of the microcontroller that are described below can also be provided in any other program-controlled units, such as microprocessors, signal processors, etc.

The program-controlled units described below are distinguished by the fact that their debug resources are able to influence not only the core but also other components of the program-controlled unit and/or the cooperation of these components with one another and/or with the core.

For the sake of completeness, it is noted that the components of the program-controlled units considered that are illustrated and described are only the components that are of particular interest in the present case.

Figure 1:
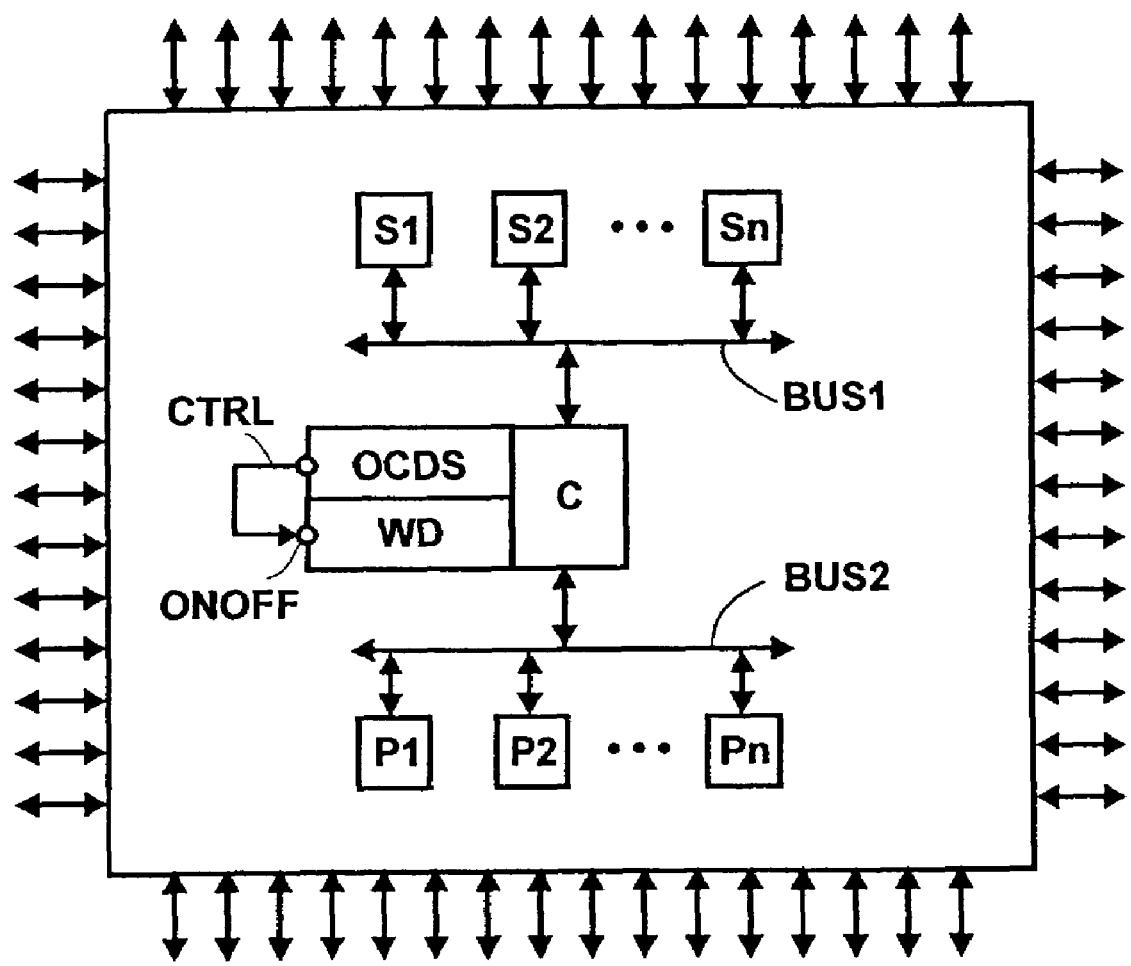
FIG. 1 is a diagrammatic illustration and block circuit diagram of a program-controlled unit in accordance with a first exemplary embodiment of the invention.

Referring now to the figures of the drawings in detail and first, particularly to FIG. 1 thereof, there is shown a program-controlled unit containing a core C, memory devices S1 to Sn connected to the core C through a first bus BUS1, periphery units P1 to Pn connected to the core C through a second bus BUS2, a watchdog timer WD, and an OCDS module OCDS.

The core C reads data representing instructions and operands from the memory devices S1 to Sn or from an external memory device that is provided outside the microcontroller and is not shown in FIG. 1, and executes the data.

The memory devices S1 to Sn may be formed by a ROM, a flash memory, a RAM, or by any other memory devices.

The peripheral units P1 to Pn are, for example, an A/D converter, a timer, a coding device, a DMA controller, a CAN controller, a USB controller, or other devices that can be integrated in microcontrollers.

The watchdog timer WD is a counter that:

automatically counts upward or downward in a specific timing;

is reset when predetermined events occur; and executes or initiates a specific action when a specific count is reached, the action including, for example, in the watchdog timer WD resetting, or putting into a specific other state, either the program-controlled unit in its entirety or, alternatively, at least the core C and/or one or more other components of the program-controlled unit.

The construction, the function and the method of operation of watchdog timers exist in the prior art so that the description of further details can be dispensed with.

The OCDS module OCDS is an OCDS module of the type mentioned in the introduction, but has a number of special features by comparison therewith. For the sake of completeness, it is noted that the OCDS module can be connected to a device provided outside the program-controlled device through one or more input and/or output terminals of the program-controlled unit, for example, through a JTAG or a NEXUS interface. The external device controls the OCDS module, i.e., specifies to the OCDS module when it has to carry out a particular action(s), and evaluates information output by the OCDS module.

In the example considered, the above mentioned special features of the OCDS module lie in the OCDS module automatically deactivating the watchdog timer if the OCDS module executes an action that alters the behavior of the program-controlled unit.

The aforementioned action is an action:
that stops or interrupts the execution of the program that is to be executed by the program-controlled unit; or
alters the speed with which the program to be executed by the program-controlled unit is executed, that is to say, for example, putting the program-controlled unit into the single-step mode; or
that causes the program-controlled unit, more precisely, the core C thereof, to execute instructions that are not part of the (application) program that is to be actually executed by the program-controlled unit, but, rather, are instructions serving for the debugging or for the emulation of the program-controlled unit.

The watchdog timer WD is deactivated by the OCDS module outputting a deactivation signal that is fed to the watchdog timer, more precisely, a terminal ONOFF provided for the activation and deactivation thereof, through a control line CTRL.

In the above mentioned situations, the watchdog timer WD is deactivated automatically, i.e., without the execution of a special instruction and without separate initiating by the external device controlling the OCDS module.

Normally, i.e., in program-controlled units without the OCDS module used-in the present case, the watchdog timer WD is activated and deactivated exclusively through a non-illustrated system control unit connected to the terminal ONOFF of the watchdog timer, the system control unit being caused to activate and deactivate the watchdog timer by instructions executed by the program-controlled unit or by a logic that initializes the program-controlled unit after the resetting thereof. In other words, in program-controlled units without the OCDS module used in the present case, a special instruction would have to be executed to be able to reset the watchdog timer during the debugging or emulation of the program-controlled unit.

The automatic deactivation of the watchdog timer that is carried out by the OCDS module used in the present case has a number of advantages over such processes. In particular, the invention makes the operation of the OCDS module simpler, and, furthermore, precludes a possible error source during debugging or emulation. The reason for the first-mentioned advantage is that it is no longer necessary to perform special actions for deactivating the watchdog timer. The reason for the second advantage is that the situation wherein the watchdog timer disturbs the debugging or emulation of the program-controlled unit is reliably precluded; a watchdog timer that is inadvertently not deactivated could lead to the program-controlled unit being reset during the debugging or emulation thereof, the resetting itself and/or the cause thereof not being readily discernable.

The watchdog timer WD is activated again, preferably, after the end of the operations in response to which the watchdog timer was deactivated, that is to say, when the program-controlled unit executes the application program normally again (is not stopped, is not operating in the single-step mode, is not executing instructions serving for debugging or for emulation). What is achieved thereby is that the program-controlled unit—insofar as is possible under the given circumstances—operates as in normal operation during the debugging or emulation thereof.

As a result of the above-described deactivation of the watchdog timer WD, the watchdog timer WD or at least specific parts thereof is or are turned off. In other words, a deactivated watchdog timer no longer counts or at least no longer initiates actions, if it reaches the count that, when reached, would cause it to initiate, in the activated state, a resetting of the program-controlled unit or of parts thereof, or other actions.

The deactivation of the watchdog timer WD can also be carried out differently than in the manner described above.

One of the possibilities suitable therefor lies in the OCDS module carrying out an automatic reconfiguration of the watchdog timer when the events in response to which the watchdog timer is to be deactivated occur. Such reconfiguration may include, for example, in the count that, when reached, causes the watchdog timer to reset the program-controlled unit or parts thereof being set to a value that cannot be reached in phases in which the program-controlled unit behaves differently than in normal operation. By such or a different reconfiguration, it is possible, as a result, to obtain the same effect as through the above-described deactivation of the watchdog timer: the watchdog timer does not reset the program-controlled unit in phases in which the latter behaves differently than in normal operation.

A further possibility for deactivating the watchdog timer lies in the OCDS module regularly resetting the watchdog timer in phases in which the program-controlled unit behaves differently than in normal operation. What can be achieved by such a process, too, is that the watchdog timer does not reset the program-controlled unit in phases in which the program-controlled unit behaves differently than in normal operation.

The watchdog timer can, furthermore, be deactivated by the OCDS module ensuring that the generation or the supply of the clock signal depending on which the watchdog timer counts is prevented. As an alternative, it might be provided that a clock signal with a lower frequency is fed to the watchdog timer. What can be achieved by these measures, too, is that the watchdog timer does not reset the program-controlled unit in phases in which the program-controlled unit behaves differently than in normal operation.

For the sake of completeness, it is noted that the OCDS module also automatically carries out the aforementioned alternatives to the first-described deactivation of the watchdog timer, if the program-controlled unit behaves differently than in normal operation.

Irrespective of all that, it may be provided that the OCDS module automatically deactivates further or other components in addition to the watchdog timer or instead of the watchdog timer, if the program-controlled unit behaves differently than in normal operation. One component for which this might prove to be advantageous is, by way of example, but quite evidently not exclusively, a DMA controller.

The automatic deactivation of the watchdog timer or other components of the program-controlled unit may also be carried out by different debug resources than an OCDS module.

It may, furthermore, be provided that the OCDS module influences the watchdog timer or other components of the program-controlled unit differently than by a deactivation. What influencing this may be depends on the respective individual case. It is an aim in each case to adapt the behavior of the influenced components, by the influencing, as optimally as possible to the altered behavior of the core. In such a case, optimum adaptation means that the influenced components, on account of the influencing, operate and cooperate such way precisely the errors and disturbances that occur in normal operation of the program-controlled unit occur during the debugging or emulation of the program-controlled unit, in other words, if possible, the errors and disturbances that occur are no more, no fewer, and no different than in normal operation of the program-controlled unit.

It may also be provided that the OCDS module or other debug resources automatically influence the cooperation of specific components with one another and/or with the core, if the program-controlled unit behaves differently than in normal operation. For the sake of completeness, it is noted that this can be effected independently of the deactivation described above.

Figure 2:
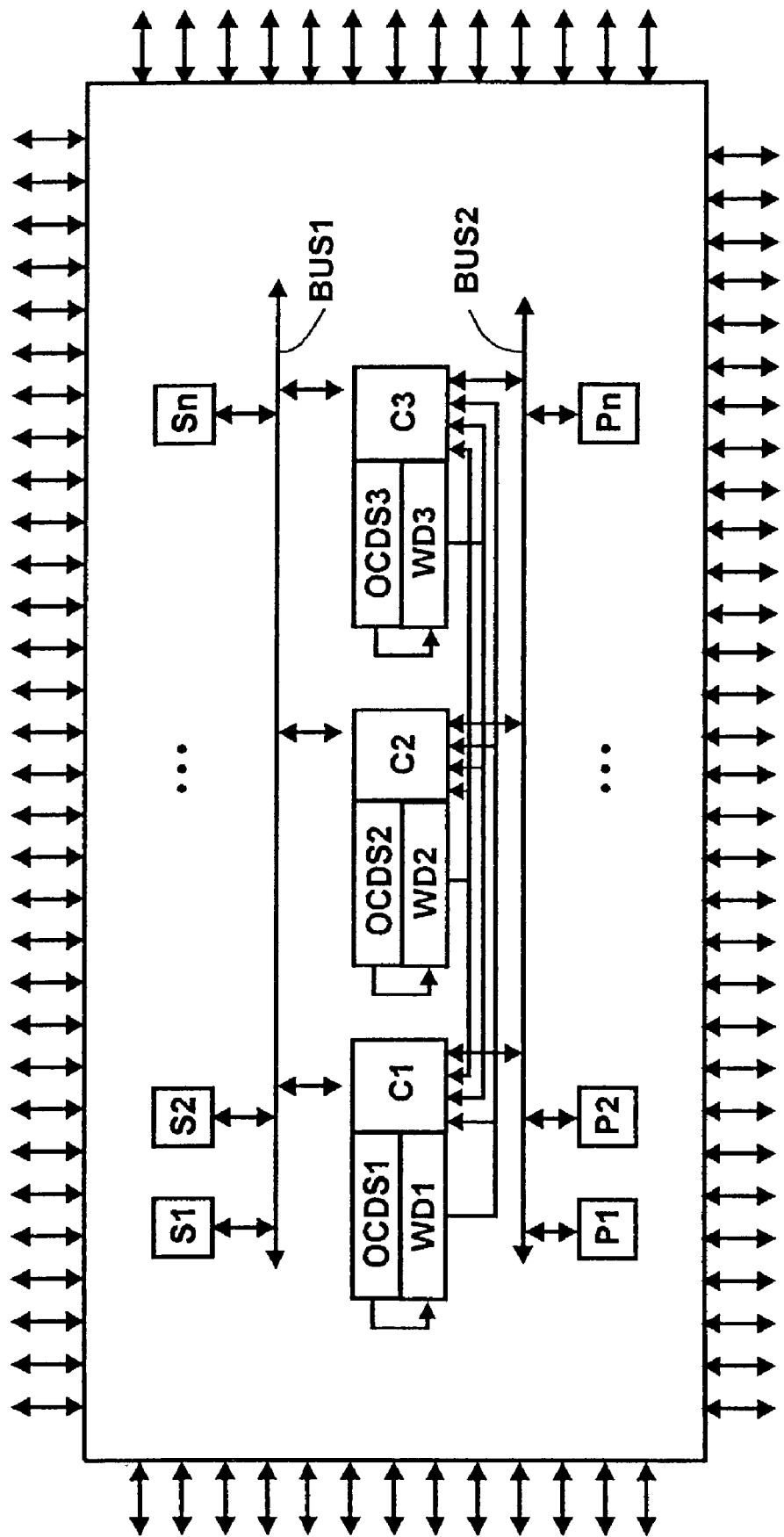
FIG. 2 is a diagrammatic illustration and block circuit diagram of a program-controlled unit in accordance with a second exemplary embodiment of the invention.

A program-controlled unit in which such is the case is illustrated in FIG. 2.

The program-controlled unit shown in FIG. 2 contains:
a plurality of cores, more precisely, a first core C1, a second core C2, and a third core C3;
a plurality of watchdog timers, more precisely, a first watchdog timer WD1 assigned to the first core C1, a second watchdog timer WD2 assigned to the second core C2, and a third watchdog timer WD3 assigned to the third core C3;
an OCDS module including three components, more precisely, a first OCDS module component OCDS1 assigned to the first core C1, a second OCDS module component OCDS2 assigned to the second core C2, and a third OCDS module component OCDS3 assigned to the third core C3; and
for the remainder, corresponds to the program-controlled unit shown in FIG. 1, i.e., contains diverse memory devices S1 to Sn and peripheral units P1 to Pn.

The memory devices S1 to Sn may be common memory devices that can be accessed by all the cores C1 to C3, or, alternatively, private memory devices may be involved that can be accessed in each case only by a specific core. The same applies correspondingly to the peripheral units.

For the remainder, the memory devices S1 to Sn and also the peripheral units P1 to Pn correspond to the memory devices and peripheral units of the program-controlled unit in accordance with FIG. 1.

The cores C1 to C3 operate in parallel. They read data representing instructions and operands from the memory devices S1 to Sn or from an external memory device that is provided outside the microcontroller and is not shown in FIG. 2, and execute the data.

The watchdog timers WD1 to WD3 in each case correspond to the watchdog timer WD of the program-controlled unit in accordance with FIG. 1. In other words, in each case counters are involved that:
automatically count upward or downward in a specific timing;
are reset when predetermined events occur; and
execute or initiate a specific action when a specific count is reached, the action including, for example, in the watchdog timer resetting, or putting into a specific other state, either the program-controlled unit in its entirety or, alternatively, at least one or more cores and/or one or more other components of the program-controlled unit.

Although the watchdog timers WD1 to WD3 are respectively assigned to a specific core, each of the watchdog timers can reset one or a plurality of arbitrary cores when the specific count is reached. What watchdog timer resets what core or what cores can be set in the watchdog timers or a non-illustrated control device.

The OCDS module components OCDS1 to OCDS3 in each case correspond to the OCDS module OCDS of the program-controlled unit in accordance with FIG. 1. However, they have a number of further special features by comparison therewith.

In the example considered, these special features lie in the OCDS module components, when they execute an action that alters the behavior of one of the cores, automatically altering the setting that defines what watchdog timer can reset what core.

The aforementioned actions are those actions in the case of which the OCDS module OCDS of the program-controlled unit in accordance with FIG. 1 deactivates the watchdog timer WD.

As a result, to name just one of a virtually unlimited number of examples, a setting in the case of which each watchdog timer resets all the cores in each case can be altered to the effect that each watchdog timer resets only in each case those cores to which it is not assigned.

In such a case, the different OCDS module components OCDS1 to OCDS3 can carry out different alterations of the settings. By way of example, it may be provided:
that the first OCDS module component OCDS1, in the case where it causes the core to which it is assigned, that is to say, the core C1, to behave differently than in normal operation (e.g., to be stopped, to be operated in the single-step mode, or to execute instructions serving for debugging or emulation), alters the existing setting to the effect that the watchdog timer WD1 assigned to the core C1 resets none of the cores present, and the other watchdog timers WD2 and WD3 can reset the core C2 and/or the core C3 but not the core C1;
that the second OCDS module component OCDS2, in the case where it causes the core to which it is assigned, that is to say, the core C2, to behave differently than in normal operation (e.g., to be stopped, to be operated in the single-step mode, or to execute instructions serving for debugging or emulation), alters the existing setting to the effect that the watchdog timer WD2 assigned to the core C2 resets none of the cores present, and the other watchdog timers WD1 and WD3 can reset the core C1 and/or the core C3 but not the core C2; and
that the third OCDS module component OCDS3, in the case where it causes the core to which it is assigned, that is to say, the core C3, to behave differently than in normal operation (e.g., to be stopped, to be operated in the single-step mode, or to execute instructions serving for debugging or emulation), alters the existing setting to the effect that the watchdog timer WD3 assigned to the core C3 resets none of the cores present, and the other watchdog timers WD1 and WD2 can reset the core C1 and/or the core C2 but not the core C3.

It goes without saying that any other combinations desired are also possible.

Furthermore, the OCDS module components can also influence whether and, if appropriate, what other components of the program-controlled unit are reset by the respective watchdog timers.

Preferably, the OCDS module components cause the setting alterations to be entirely or partly reversed again if the core to which they are respectively assigned is operating normally again (is no longer stopped, is no longer operating in the single-step mode, and is not executing a program serving for debugging or emulating, etc.).

As a result of the setting alterations that can be carried out by the OCDS module components, it is possible, during the debugging or emulation of the program-controlled unit, for the latter to be brought into a state in which the debugging or the emulation is disturbed as little as possible, and/or the program-controlled unit behaves as a normal operation—insofar as is possible under the given circumstances—during the debugging or emulation.

Furthermore, it may (but need not) be provided that the OCDS module components can deactivate the watchdog timers like the OCDS module of the program-controlled unit in accordance with FIG. 1.

The program-controlled units described make it possible, independently of the details of the practical realization, for errors occurring therein to be localized and eliminated under all circumstances rapidly and simply.

I claim:

1. A program-controlled unit, comprising:
   a plurality of cores for executing a program;
   a plurality of watchdog timers, each watchdog timer being configured to put one or more of the plurality of cores into a specific state if a specific condition is reached;
   on-chip debug resources, located on the same chip as the program-controlled unit and said plurality of cores, said on-chip debug resources including a plurality of on-chip debug module components, each on-chip debug module component connected to one of said plurality of cores for tracking and influencing operations proceeding within said one of said plurality of cores;
   said on-chip debug resources altering at least one setting that defines whether a particular one of said plurality of watchdog timers can reset a particular one of said plurality of cores;
   other components connected to at least one of said on-chip debug resources and at least one of said plurality of cores; and
   said on-chip debug resources influencing at least one of:
      said other components; and
      cooperation of said other components with at least one of:
         one another; and
         at least one of said plurality of cores.

2. The program-controlled unit according to claim 1, wherein said other components are components having behavior influencing a behavior of at least one of said plurality of cores.

3. The program-controlled unit according to claim 1, wherein said other components include at least one watchdog timer.

4. The program-controlled unit according to claim 1, wherein said on-chip debug resources perform at least one of:
   deactivate said other components;
   turn off said other components;
   place said other components into a given state;
   reset said other components;
   reconfigure said other components; and
   alter signals fed to said other components.

5. The program-controlled unit according to claim 1, wherein said on-chip debug resources deactivate said other components.

6. The program-controlled unit according to claim 1, wherein said on-chip debug resources turn off said other components.

7. The program-controlled unit according to claim 1, wherein said on-chip debug resources place said other components into a given state.

8. The program-controlled unit according to claim 1, wherein said on-chip debug resources reset said other components.

9. The program-controlled unit according to claim 1, wherein said on-chip debug resources reconfigure said other components.

10. The program-controlled unit according to claim 1, wherein said on-chip debug resources alter signals fed to said other components.

11. The program-controlled unit according to claim 1, wherein the influencing of said other components by said on-chip debug resources is at least one of the group consisting of:
   a deactivation of said other components;
   a turning off of said other components;
   a placement of said other components into a given state;
   a reset of said other components;
   a reconfiguration of said other components; and
   an alteration of signals fed to said other components.

12. The program-controlled unit according to claim 1, wherein the influencing of said other components by said on-chip debug resources is a deactivation of said other components.

13. The program-controlled unit according to claim 1, wherein the influencing of said other components by said on-chip debug resources is a turning off of said other components.

14. The program-controlled unit according to claim 1, wherein the influencing of said other components by said on-chip debug resources is a placement of said other components into a given state.

15. The program-controlled unit according to claim 1, wherein the influencing of said other components by said on-chip debug resources is a reset of said other components.

16. The program-controlled unit according to claim 1, wherein the influencing of said other components by said on-chip debug resources is a reconfiguration of said other components.

17. The program-controlled unit according to claim 1, wherein the influencing of said other components by said on-chip debug resources is an alteration of signals fed to said other components.

18. The program-controlled unit according to claim 1, wherein said on-chip debug resources prevent said other components from cooperating.

19. The program-controlled unit according to claim 1, wherein the influencing of cooperation of said other components is a prevention of cooperation.

20. The program-controlled unit according to claim 1, wherein said on-chip debug resources initiate cooperation of components not otherwise cooperating.

21. The program-controlled unit according to claim 1, wherein the influencing of cooperation of said other components is an initiation of cooperation of components not otherwise cooperating.

22. The program-controlled unit according to claim 1, wherein, when predefined events occur, said on-chip debug resources automatically carry out at least one of: (a) influencing of said other components; and (b) the cooperation of said other components with at least one of, (i) one another and (ii) at least one of said plurality of cores.

23. The program-controlled unit according to claim 22, wherein said predefined events include an altering of an overall behavior by actions executed by said debug resources.

24. The program-controlled unit according to claim 22, wherein said predefined events include said on-chip debug resources executing actions altering a behavior of at least one of said plurality of cores.

25. The program-controlled unit according to claim 22, wherein said predefined events include said on-chip debug resources stopping execution of said program.

26. The program-controlled unit according to claim 22, wherein said predefined events include said on-chip debug resources altering a speed at which said program is executed.

27. The program-controlled unit according to claim 22, wherein said predefined events include said on-chip debug resources causing said core to execute said program in a single-step mode.

28. The program-controlled unit according to claim 22, wherein said predefined events include said on-chip debug resources causing execution of instructions not part of said program.

29. The program-controlled unit according to claim 22, wherein said predefined events include said on-chip debug resources causing execution of instructions of one of a debugging program and an emulation program.

30. A program-controlled unit, comprising:

a plurality of cores for executing a program;

a plurality of watchdog timers, each watchdog timer being configured to put one or more of the plurality of cores into a specific state if a specific condition is reached;

on-chip debug resources, located on the same chip as the program-controlled unit and said plurality of cores, connected to said plurality of cores, for tracking and influencing operations proceeding within said plurality of cores; and said on-chip debug resources being able to reconfigure said plurality of watchdog timers such that a specific one of said cores can no longer be put into a specific state by any of the watchdog timers and at least one of the other cores still being put into a specific state by at least one of the watchdog timers.

31. A program-controlled unit, comprising:

a plurality of cores for executing a program;

a plurality of watchdog timers, each watchdog timer being configured to put one or more of the plurality of cores into a specific state if a specific condition is reached;

on-chip debug resources, located on the same chip as the program-controlled unit and said plurality of cores, connected to said plurality of cores, for tracking and influencing operations proceeding within said plurality of cores; and said on-chip debug resources being able to alter a setting that defines what watchdog timer can put what core into a specific state.

* * * * *